United States Patent [19]

Cordi et al.

[11] 3,737,881

[45] June 5, 1973

[54] IMPLEMENTATION OF THE LEAST RECENTLY USED (LRU) ALGORITHM USING MAGNETIC BUBBLE DOMAINS

[75] Inventors: Vincent A. Cordi, Vestal; Ted Y. Nickel, Endwell, both of N.Y.

[73] Assignee: International Business Machines Corporation, Armonk, N.Y.

[22] Filed: Apr. 13, 1972

[21] Appl. No.: 243,752

[52] U.S. Cl. ........................340/174 TF, 340/174 SR

[51] Int. Cl. ..........................G11c 11/14, G11c 19/00

[58] Field of Search .........................340/173, 174 SR, 340/174 TF; 307/221

[56] References Cited

UNITED STATES PATENTS

| | | | |
|---|---|---|---|
| 3,670,313 | 6/1972 | Beausoleil | 340/174 TF |
| 3,701,132 | 10/1972 | Bonyhard et al. | 340/174 TF |

*Primary Examiner*—Stanley M. Urynowicz, Jr.
*Attorney*—John C. Black, E. W. Galbi and J. Jancin, Jr.

[57] ABSTRACT

A Least Recently Used (LRU) Algorithm is implemented in a dynamically ordered, magnetic bubble domain shift register to enhance both the speed and cost reduction of paging between levels of a storage hierarchy containing a large quantity of data.

5 Claims, 2 Drawing Figures

IMPLEMENTATION OF THE LEAST RECENTLY USED (LRU) ALGORITHM USING MAGNETIC BUBBLE DOMAINS

CROSS REFERENCES TO RELATED APPLICATIONS

U.S. Pat. application of W. F. Beausoleil et al, Ser. No. 126,822, filed Mar. 22, 1971, now U.S. Pat. No. 3,670,313 shows and claims a dynamically ordered magnetic bubble domain shift register of the type described in the present application.

BACKGROUND OF THE INVENTION

In a multi-level storage hierarchy, devices and technologies with varying speeds, storage sizes and cost per storage cell are organized in a way that gives the appearance of a large, fast, single level storage unit. This "virtual" large and fast storage hierarchy is thus realized at a fraction of the cost of using only the fastest access technology. Since the central processing unit typically can only access the fastest level of storage, a method of arranging and distributing storage is needed to make practical the transfer of data from level to level. One such method is partitioning of storage at each level of the hierarchy into fixed sized blocks called "pages," each page having its own unique address at any level.

When information is requested by the system and is not presently in the fastest level of storage, it must be brought in (paged) from some slower level of the storage hierarchy. As is usually the case, the faster levels of storage are full and some information presently there must be removed and replaced with the new information. This holds true for all levels in the hierarchy. When deciding which page to remove, one strategy is to maintain a running account of page usage and to replace that page which has been least recently used. This replacement strategy is referred to as the "LRU" algorithm. The use of standard hardware to accomplish this task at the slower, larger levels of storage can be very expensive since many pages must be tabulated.

Magnetic bubble domain technology lends itself to building a dynamically ordered shift register memory. This can be incorporated as one of the levels of the storage hierarchy and/or also used to implement the LRU algorithm for the slower memory levels.

To construct a dynamically ordered shift register, the technology requirements are that it has the capability of shifting right or left, is static in nature and is low in cost. The magnetic bubble domain technology satisfies these requirements.

SUMMARY OF THE INVENTION

To order the shift register so that the most recently used data is at the read-write station in position N, second most recently used data in position N−1, . . . and finally, the least recently used data in position "1," the following algorithm has been employed in the abovesaid related application:

When data is requested at the read-write station,

1. Use a first shift path including the read-write station to shift in one direction (e.g. left) the number of times required to get the requested bit into the read-write position N.
2. Use a second shift path excluding the read-write station to shift the same number of times in the opposite direction (e.g. right).

This always results in dynamic ordering with the least recently used bit residing in the furthest position from the read-write position.

To implement the LRU algorithm for a level of storage containing N pages, the length of the register must be N bit positions and the width (number of address bit registers operated in parallel) must be K where N equals 2 to the K power. All register rings run synchronously, and the corresponding bit positions in each ring combine to contain unique pages of data and their addresses.

As the pages are referenced, the pages and their addresses in these rings are dynamically reordered making use of the above explained algorithm. However, if a page must be replaced, the page and address in position "1" must be read out to locate the page to be replaced. This page is then placed at the front of the registers with each of the remaining original pages in position $i$ being moved to position $i-1$. This can be accomplished by using the following improved shifting algorithm:

1. Shift right one position using the second shift path which transfers the desired page in position 1 to position N−1.
2. Shift left one position using the first shift path which transfers the desired page from position N−1 to the read-write position N.
3. Shift right one position using the second shift path to reorder the pages and their addresses.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
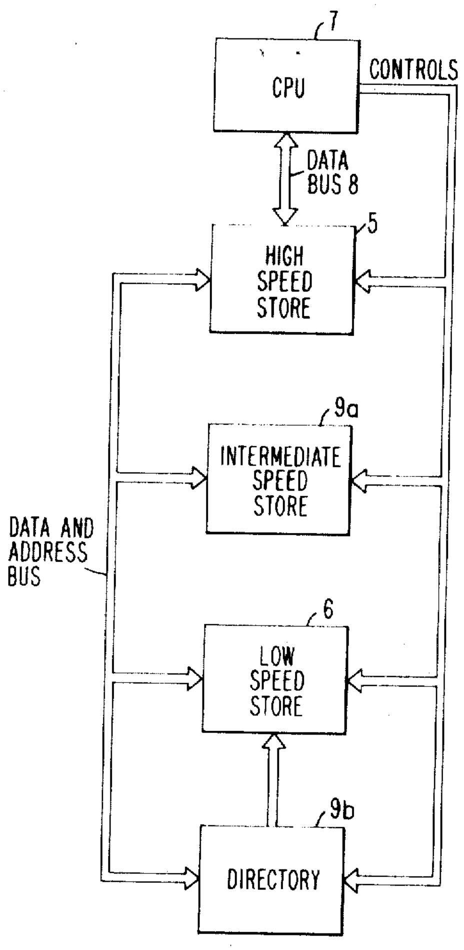
FIG. 1 is a diagrammatic illustration of a memory hierarchy making use of the improvement of the present application.

FIG. 1 diagrammatically illustrates a conventional memory hierarchy including a high speed store (or cache) 5, an intermediate speed store 9*a* comprised of the improved shift register of the present application, a low speed (e.g. magnetic disk) store 6 with a directory 9b comprised of the improved shift register.

A central processing unit (CPU) 7 has direct access only to data in the cache 5 via data bus 8. Data is paged (transferred in page increments) between the various levels 5, 9a, 6 of the storage hierarchy under program control in a known manner to improve the overall system performance.

Figure 2:
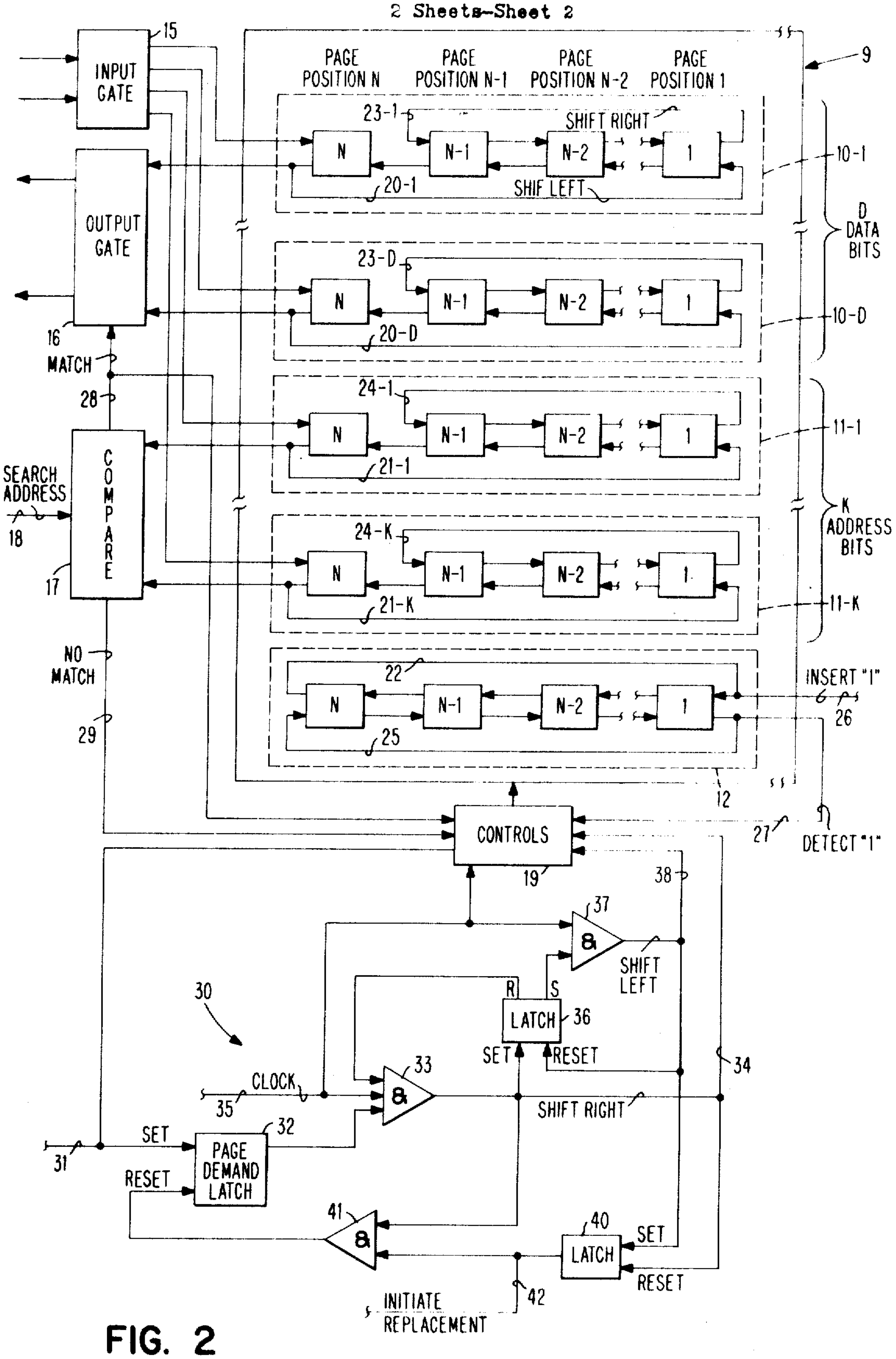
FIG. 2 is a fragmentary diagrammatic illustration of a magnetic domain shift register incorporating the improvement of the present application.

The apparatus 9 of FIG. 2 includes a plurality of shift registers 10–1 to 10–D, 11–1 to 11–K and 12 preferably of the magnetic domain type described in greater detail in the abovesaid copending Beausoleil et al. application, which application is hereby incorporated herein by reference as if it were set forth herein in its entirety.

The registers 10–1 to 10–D store data in corresponding bit positions thereof. As part of an intermediate storage device 9*a*, FIG. 1, the registers 10–1 to 10–D store pages of data to be used in processing. Alternatively, the registers 10–1 and 10–D include the physical addresses (e.g. control unit, drive, head, cylinder, track) of such data if the register 9 is merely a directory such as 9*b*, FIG. 1, for a slow speed store rather than an intermediate level of storage in a hierarchy.

The corresponding bit positions of the registers 11–1 to 11–K store the addresses (or identifiers) of the data in the corresponding bit positions of the registers 10–1 to 10–D. When the apparatus 9 is used as a storage level 9*a*, FIG. 1, registers 11–1 to 11–K store the register addresses of the pages. When apparatus 9 is used as a directory 9*b*, FIG. 1, registers 11–1 to 11–K store "virtual" addresses and registers 10–1 to 10–D store corresponding real or physical addresses of pages of data in store 6.

The register 12 is a counting mechanism which controls reordering of data as will be seen below.

Each of the registers 10–1 to 10–D, 11–1 to 11–K and 12 include positions 1 to N. Positions N of registers 10–1 to 10–D are the read-write positions which are connected to input and output gates 15 and 16.

Positions N of registers 11–1 to 11–K are connected to input gates 15 and to an output compare circuit 17. Search arguments in the form of addresses are applied via bus 18 to the compare circuit 17 to search for selected data in the apparatus 9.

Suitable controls 19, described more fully in said copending application, control the shifting of data in the apparatus 9 via shift left paths 20–1 to 20–D, 21–1 to 21–K and 22 including all positions of the registers. Controls 19 also control shift right paths 23–1 to 23–D, 24–1 to 24–K and 25. Paths 23–1 to 23–D and 24–1 to 24–K do not include read-write positions N.

Associated with apparatus 9 are logical circuits 30 which together with controls 19 operate to execute the improved LRU algorithm when replacement of a page is required. A request for a new page causes a signal on SET line 31, which sets a latch 32. Latch 32 prepares an AND circuit 33 for producing a shift right signal on line 34 in response to a first clock signal on line 35. The line 34 is connected to a SET input of a latch 36 which, when set, prepares an AND circuit 37 to produce a shift left signal on line 38 in response to a second clock signal on line 35. Line 38 is also connected to a RESET input of latch 36 and to a SET input of a latch 40. Latch 36 in the reset state again prepares AND circuit 33 to produce a second shift right pulse on line 34 in response to a third clock signal on line 35. The latch 40, in the SET state, and the second shift right pulse control an AND circuit 41 to reset latch 32. A signal on the output line 42 of latch 40 initiates a conventional paging program for replacement of the data in positions N of registers 10–1 to 10–D and 11–1 to 11–K.

The operation of the apparatus 9 will now be described. Each time that new data and its address is entered into positions N of registers 10–1 to 10–D and 11–1 to 11–K, the data and address (if any) in register positions 1 will have been previously moved (as will be described below) to positions N for replacement and the data and addresses in positions N to 2 (not shown) will have been reordered, i.e. shifted to positions N−1 to 1.

When a search is made for desired data in apparatus 9, the address of the desired data is applied to compare circuit 17 by way of line 18. The controls 19 shift data step by step (clock pulses on line 35) in the shift left paths 20–1 to 20–D, 21–1 to 21–K and 22.

After each step, circuit 17 compares the address in positions N of registers 11–1 to 11–K with the address on line 18. When a match occurs, a pulse on line 28 gates data from positions N of registers 10–1 to 10–D through output gates 16. When no match occurs, a pulse on line 29 conditions controls 19 to shift data in the registers 10–1 to 10–D, 11–1 to 11–K and 12 one more step.

After data has been gated out via circuit 16 in response to a match, the controls 19 initiate the dynamic reordering of the data (and addresses) in positions N−1 to 1 under control of the register 12. When the first data (and its address) is entered into positions N apparatus 9 during an initialization procedure, a logical 1 bit is entered into position 1 of register 12 via line 26 and all other positions store logical 0 bits.

This logical 1 bit will always be in position 1 of register 12 when the data is dynamically ordered. For example, when the second data is entered into the apparatus 9, the first data is moved one position to positions 1 (by the LRU algorithm described below) via the shift left paths and then one position to position N−1 by the shift right paths. The logical 1 bit in register 12 is also moved left one position then right one position, i.e. back to position 1. This signals on detect line 27 that dynamic reordering has been completed.

Assume that, after every position of apparatus 9 has been searched (the logical 1 bit is again in position 1 of register 12), no match was found. The controls 19 initiate the LRU algorithm by setting the latch 32. Three steps will be performed in sequence as described above with respect to circuit 30, i.e. shift right one position, shift left one position, shift right one position.

The following example illustrates the operation assuming four position registers with ordered pages of data

A B C D in registers N, N−1, N−2 and 1 respectively, where

A = Most recently used
B = Second most recently used
C = Third most recently used
D = Least recently used After applying step one of the algorithm (shift right), the ordering is,

A D B C

After applying step two of the algorithm (shift left), the ordering is,

D B C A (Read out address stored in D to start replacement procedure.)

After applying step three (shift right), the ordering is,

D A B C where

D = Most recently used (but to be replaced by new data)
A = Second most recently used
B = Third most recently used
C = Least recently used Thus, after two steps, the address of the LRU page can be read out to start the replacement procedure; and after three steps, the page addresses are in the correct new ordering, awaiting further references. Note that the complete reordering takes three steps regardless of the length 'N' of the rings. To accomplish the same feat using the earlier described algorithm would take 2 (N−1) steps, a considerable time if many pages are involved. It is also apparent that the algorithm can be used with any technology capable of meeting the shift left and shift right requirements along with the static information holding capability.

In a preferred implementation, a plurality of register stores 9 (not shown) are operated in parallel in a store such as 9*a* or a directory such as 9*b* of FIG. 2. This has the advantage of faster searching (in parallel), the opportunity to allocate pages with the highest frequency of use to different stores 9, and to permit the operation of other stores such as 9 when one is tied up waiting for the replacement of data therein.

While the invention has been particularly shown and described with reference to a preferred embodiment thereof, it will be understood by those skilled in the art that the foregoing and other changes in form and details may be made therein without departing from the spirit and scope of the invention.

We claim:

1. In a data processing system of the type wherein a multilevel storage hierarchy includes high, intermediate and low speed storage devices forming the storage elements of three different levels in the hierarchy, wherein storage elements in each level are partitioned into fixed size blocks storing pages of data, each page having its own unique address at any level, wherein the processing means of the system have direct access to only the high speed storage device in the fastest one of said levels, and wherein program controlled means are provided for making data access requests and for replacing the least recently used pages of data in one level with new pages of data from another level when required, the intermediate speed storage device of said hierarchy comprising a plurality of magnetic domain shift registers, each including an accessing position N for accessing the register for reading and writing, N−1 other positions coupled in a first loop for transferring data between said other positions without placing the data in the accessing position, and means for inserting and removing said access position into said first loop to form a second loop to transfer data from any one of the N−1 other positions into the access position for reading or writing;

means responsive to a data access request for moving data in one direction in the second loop to transfer desired data to the accessing position;

means including a count means for moving data in the other positions in the opposite direction within the first loop to reorder the data in order of most recent use;

control means effective when a page is to be replaced in the storage device for shifting the pages of data one position in the opposite direction in the first loop and then one position in the one direction in the second loop to move the least recently used data to the accessing position for replacement; and control means for shifting the pages of data one position in the opposite direction in the first loop to reorder the data according to most recent use.

2. The system of claim 1 further comprising a directory for the low speed storage device including a plurality of magnetic domain shift registers storing in corresponding positions thereof a symbolic address and a physical address for pages of data stored in the device, each register including a read-write position N, N−1 other positions coupled in a first loop, and means for coupling position N and the other positions in a second loop, means responsive to a data access request for shifting data in one direction in the second loop and including a compare means for comparing each symbolic address in position N with a search argument address, means responsive to a match in the compare circuit for reading out the corresponding physical address to access data from the low speed storage device.

3. The system of claim 2 further comprising means responsive to a match in the compare circuit for shifting data in the opposite direction in the first loop to reorder the addresses in the order of most recent use.

4. A method for replacing least recently used data in dynamically ordered data store system comprising the steps of providing an N position magnetic domain shift register with N−1 positions coupled in a first loop, and a second loop including a position N coupled to the N−1 positions, entering new data into the register and removing data from the register by way of position N, dynamically ordering and reordering data within the register for accessing the most recently used data in the register with minimum delay by shifting the data in one direction in the second loop a number of positions required to move data to be accessed into position N and by thereafter shifting data an equal number of positions in the opposite direction in the first loop, and replacing the least recently used data by shifting the data one position in said other direction in the first loop, shifting the data one position in said one direction in the second loop thereby moving the least recently used data to position N, and shifting the data one position in said other direction in the first loop thereby reordering the data according to most recent use.

5. A method for operating a dynamically ordered store in a paging system comprising the steps of providing a plurality of synchronously operated N position magnetic domain shift registers, each with N−1 positions coupled in a first loop, and a second loop including a position N coupled to the N−1 positions, searching for desired data in the registers by shifting data step by step in one direction through the second loop and comparing address bits of the data in positions N after each step for a match with a search argument address, after each match, reading out the data in position N and dynamically reordering data within the registers in the order of most recent use by shifting data in the opposite direction in the first loop a number of positions equal to that required to move the desired data into position N, and after each failure to find a match, replacing the least recently used data by shifting the data one position in said other direction in the first loop and shifting the data one position in said one direction in the second loop thereby moving the least recently used data to position N, by shifting the data one position in said other direction in the first loop thereby reordering the data according to most recent use, and replacing the data in position N with new data.

* * * * *